United States Patent [19]

Dye

[11] Patent Number: 4,801,833
[45] Date of Patent: Jan. 31, 1989

[54] MOTOR END CAP

[75] Inventor: Clifford L. Dye, Eaton Rapids, Mich.

[73] Assignee: Eaton Stamping Company, Eaton Rapids, Mich.

[21] Appl. No.: 111,114

[22] Filed: Oct. 21, 1987

Related U.S. Application Data

[63] Continuation of Ser. No. 808,068, Dec. 12, 1985, abandoned.

[51] Int. Cl.$^4$ ............................................. H02K 13/00
[52] U.S. Cl. ...................................... 310/239; 310/43; 310/68 C; 310/89; 310/91; 337/380
[58] Field of Search ............... 310/40 MM, 51, 43, 89, 310/90, 68 C, 91, 71, 42, 239, 240, 241, 245, 247, 298, 242; 337/380; 361/23, 24, 25; 29/596, 597

[56] References Cited

U.S. PATENT DOCUMENTS

| | | | |
|---|---|---|---|
| 3,422,294 | 1/1969 | Parker | 29/596 |
| 3,745,393 | 7/1973 | Spors | 310/247 |
| 3,759,019 | 9/1973 | Wells | 310/91 |
| 3,791,684 | 2/1974 | Hamman | 290/38 |
| 3,792,298 | 2/1974 | Hamman | 310/242 |
| 3,826,935 | 7/1974 | Grierson | 310/43 |
| 3,875,462 | 4/1975 | Kiefer | 310/43 |
| 4,112,321 | 9/1978 | Wan | 310/242 |
| 4,209,723 | 6/1980 | Hamman | 310/112 |
| 4,225,798 | 9/1980 | Barrett | 310/239 |
| 4,293,789 | 10/1981 | King | 310/239 |
| 4,384,224 | 5/1983 | Spitler | 310/89 |
| 4,409,505 | 10/1983 | Petersen | 310/90 |
| 4,513,214 | 4/1985 | Dieringer | 310/239 |
| 4,673,838 | 6/1987 | Takagi | 310/89 |

Primary Examiner—R. Skudy
Attorney, Agent, or Firm—Beaman & Beaman

[57] ABSTRACT

An end cap for small electric motors using brushes, the end cap being molded of a synthetic plastic dielectric material. Brush-receiving guides are defined on the end cap by homogeneous cantilevered fingers which are deflectable to grip the brush therein during assembly of the end cap to a motor casing. Electric conductor and connector retainers are homogeneously defined on the end cap to provide conductor strain relief, a circuit breaker retainer is homogeneously included in the cap configuration, and tie bolt ears are of such configuration as to cooperate with the motor casing to resist deflection.

5 Claims, 2 Drawing Sheets

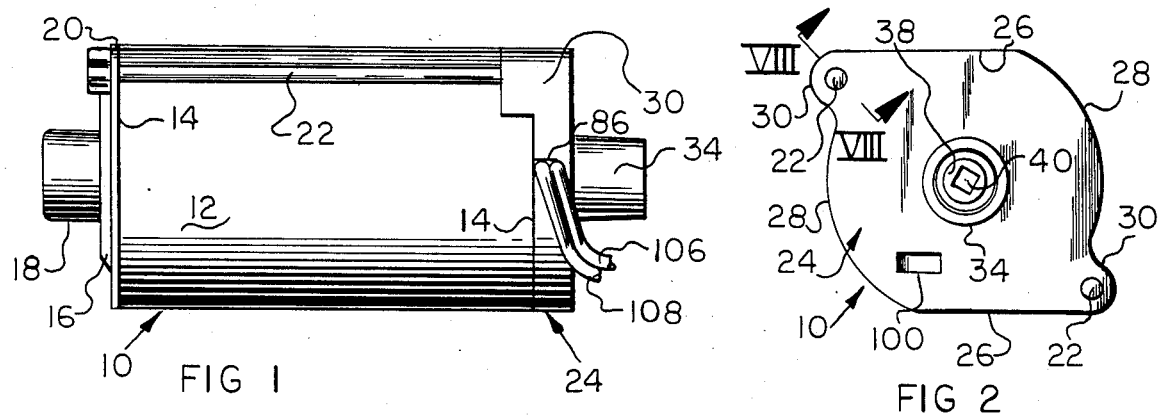
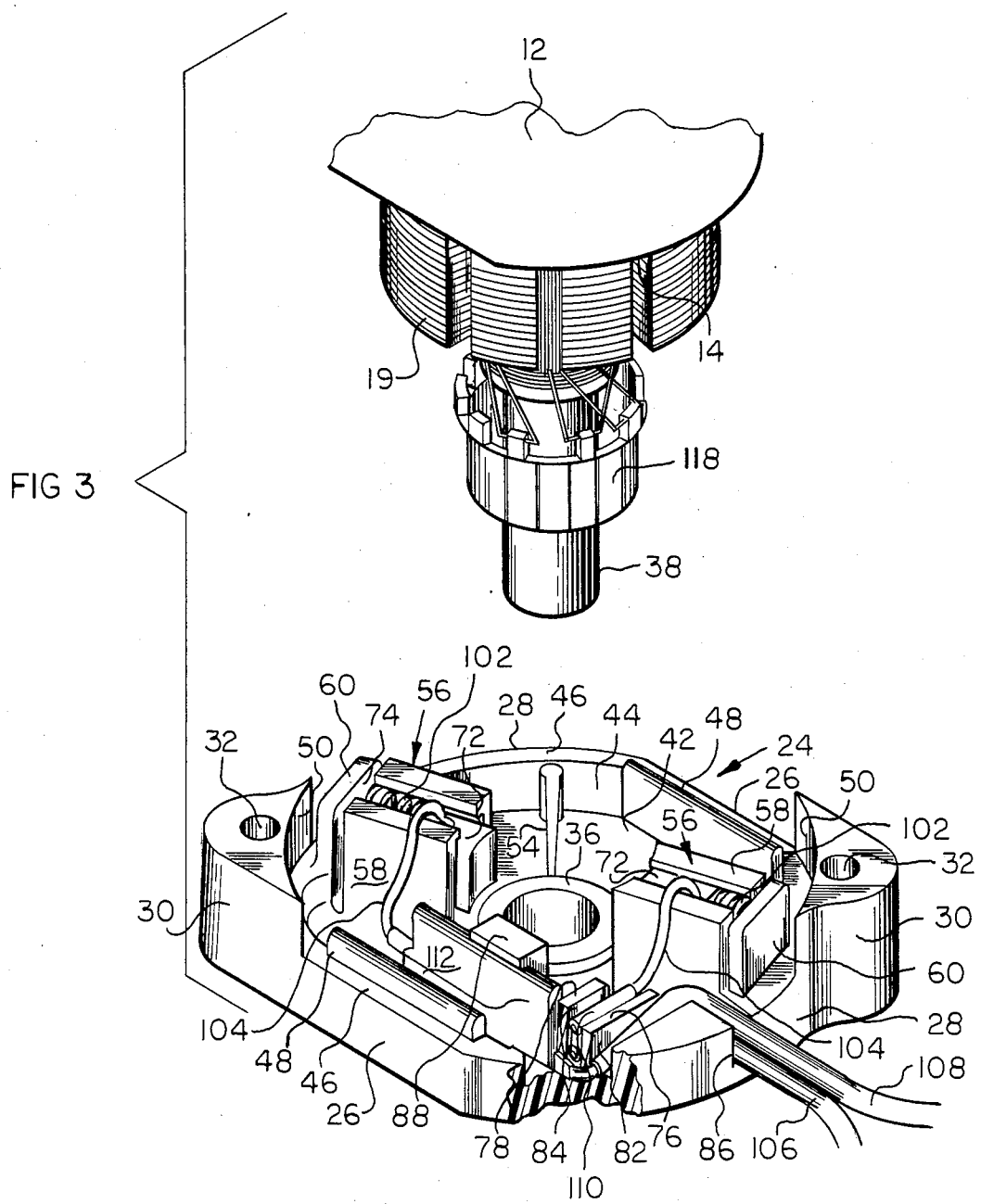

MOTOR END CAP

This is a continuation application of application Ser. No. 808,068 filed 12/12/85, now abandoned.

BACKGROUND OF THE INVENTION

The invention particularly pertains to an end cap for small electric motors, usually of the direct current type, wherein an end cap is mounted upon the end of a metal motor casing. In particular, the invention is directed to the features of the end cap for reducing cost, simplifying assembly and improving operation and dependability.

Small electric motors often include armature brushes associated with, or located within, an end cap mounted upon the end of the motor casing. The design and construction of brush holders is significant in reducing the cost of the electric motor, and simplifying motor assembly, and examples of motor brush structure for small electric motors are shown in the assignee's U.S. Pat. Nos. 3,791,684 and 3,792,298.

To reduce costs and improve motor assembly techniques, it is known to form the motor end cap of a dielectric synthetic plastic material by an injection molding procedure, and an example of such a construction is shown in the assignee's U.S. Pat. No. 4,209,723.

In the constructions shown in the aforementioned patents, the brushes are mounted upon a brush card separate from the end cap, and the brush cards consist of a plurality of brush holders separately assembled to a dielectric card or support. In these patented devices the use of a separate brush card increases manufacturing costs and complicates motor assembly.

An object of the invention is to provide a molded dielectric synthetic plastic end cap for electric motors wherein brush holders and guides are homogeneously defined on the end cap of the material thereof.

It is also an object of the invention to provide a molded dielectric synthetic plastic end cap for electric motors wherein a brush holder and guide is defined on the end cap by homogeneous cantilevered fingers capable of being deformed for frictionally gripping the brush to hold the brush in a retracted position during assembly of the end cap to a motor armature.

An additional object of the invention is to provide a molded dielectric synthetic plastic motor end cap having retainers defined therein for guiding and receiving electrical conductors and maintaining the electrical conductors at right angles relative to an access opening defined in the end cap wherein an effective conductor anchoring and strain relief is achieved simply by inserting the conductors into the retainers as the conductors are assembled to the end cap.

Yet another object of the invention is to provide a molded dielectric synthetic plastic end cap having a homogeneous circuit breaker retainer defined thereon permitting a circuit breaker to be readily assembled to the end cap and maintained thereon by a positive holding force.

A further object of the invention is to provide a molded dielectric synthetic plastic end cap for an electric motor wherein the end cap is held to the motor by tie bolts extending through ears formed on the end cap, and the ears are of such configuration as to cooperate with the motor casing to resist deflection and bending as the tie bolts are tightened.

In the practice of the invention the entire end cap for a small electric motor is molded by injection molding and formed of a dielectric synthetic plastic material of relatively rigid characteristics. The end cap includes ears having holes defined therein through which tie bolts extend for maintaining the end cap upon the associated motor casing, and the ears include an axially extending portion closely overlapping and engaging a portion of the motor casing in an axial direction whereby the configuration of the ears causes the portions of the ears overlapping the motor casing to be radially deflected inwardly upon the motor casing as the tie bolts are tightened, and engagement of the ears with the motor casing minimizes ear deflection and permits relatively high tie bolt tension without damage to the end cap.

The end cap includes an inner surface disposed toward the motor casing interior, and a plurality of projections and configurations homogeneously extend from this inner surface for defining brush holding apparatus, strain relief means for motor electric conductors, and a retainer for a circuit breaker which protects the motor against electrical overload.

The end cap includes a central recess for receiving a bearing which rotatably supports one end of the motor armature, and spaced about the bearing are a plurality of sets of brush retaining fingers. Each brush set consists of two fingers of dielectric synthetic plastic material homogeneously extending from the end cap inner side and each having a free cantilevered end. The fingers of a set are parallel and spaced from each other having an inner configuration defining a guide for reciprocally receiving a conventional electric motor brush.

A spring anchor also homogeneously extends from the material of the motor cap in alignment with a brush guide defined by a pair of fingers, the anchor being located at the end of the brush guide remote from the end cap armature bearing, and unattached with respect to the associated fingers.

A slot is defined between the set of fingers at their free ends wherein the brush conductor may extend therethrough, and as the fingers are only supported at the end cap, the free ends of the fingers, and the portions of the fingers adjacent to the free ends, are capable of being deformed toward each other so as to frictionally grip a brush located therebetween. Forked clamps, or similar tools, may be used to deform the fingers of an associated set toward each other to hold the brush in a retracted position during assembly of the end cap to the armature. The natural resiliency of the fingers restores the dimension of the brush guide to its original shape after the deforming tools are released permitting the associated brush to freely reciprocate within the defined guide, and a coil compression spring interposed between the brush and the associated spring anchor biases the brush into engagement with the motor armature.

A notch is formed in the periphery of the end cap for receiving the electrical conductors required to supply electricity to the motor. Conductor retainers in the form of ribs are defined within the end cap adjacent the conductor notch for receiving the conductors, or conductor connectors, and the conductor retainers are of such configuration that the portion of the conductors received within the retainers are at right angles to the conductor portions extending through the end cap, and this relationship provides excellent conductor strain relief resisting tension forces imposed upon the conductors, and preventing such tension from being transferred to the brush conductors, or the circuit breaker conductor, located within the end cap.

The end cap configuration also includes a cantilevered hook homogeneously extending from the cap inner surface having a shoulder defined at its outer end in spaced relationship to a cradle or bed defined in the end cap. The configuration of the hook and cradle is such as to permit a small circuit breaker to be inserted therebetween and retained on the end cap by the hook shoulder. As the hook is resiliently deflectable it may be momentarily deflected away from the cradle to permit insertion of the circuit breaker, but the resilient nature of the hook assures dependable circuit breaker retention during motor operation.

The construction of an electric motor molded end cap utilizing the aforementioned features reduces the cost of the end cap, simplifies assembly of the brushes, springs, conductors and circuit breaker into the end cap, simplifies assembly of the end cap to the motor casing, while providing a more dependable end cap with respect to the electrical, assembly and handling characteristics.

BRIEF DESCRIPTION OF THE DRAWINGS.

The objects and advantages of the invention will further be appreciated from the following description and accompanying drawings wherein:

FIG. 1 is an elevational side view of an electric motor utilizing an end cap in accord with the invention, FIG. 2 is an elevational view of the electric motor of FIG. 1 as taken from the right end thereof, FIG. 3 is a detail, enlarged, perspective, exploded view illustrating a motor end cap in accord with the invention, and also illustrating a portion of the motor armature and casing.

DESCRIPTION OF THE PREFERRED EMBODIMENT

Figure 4:
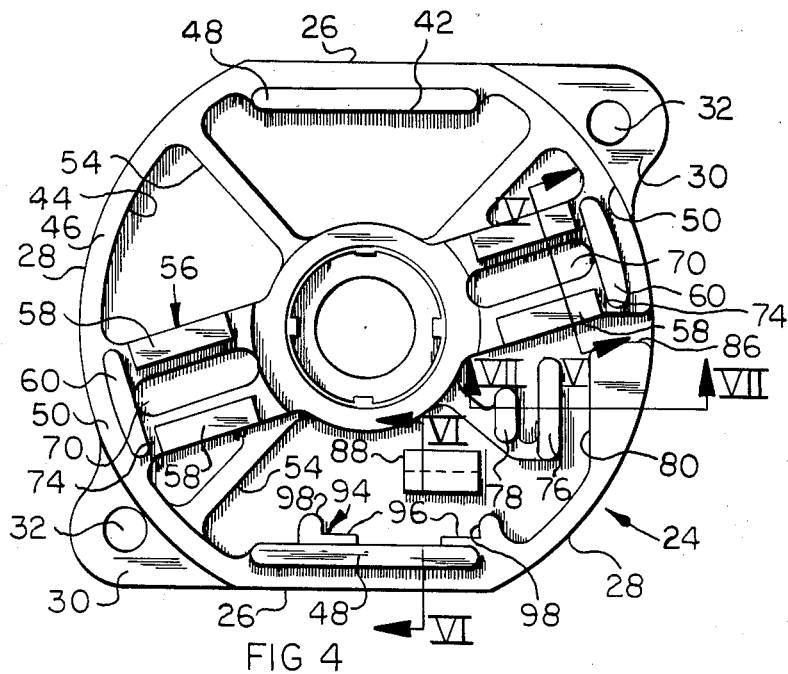
FIG. 4 is a plan view of the inner side of a molded end cap constructed in accord with the invention.

FIG. 1 illustrates the typical electric motor 10 with which the end cap of the invention is employed. The motor includes a metal casing 12 of tubular configuration having flat ends 14, and in the disclosed form the casing is of a somewhat elliptical transverse cross section having opposed flattened upper and lower portions and cylindrical side portions. The left end, FIG. 1, of the motor casing is enclosed by stamped metal end cap 16 which includes a bearing housing 18 in which a bearing, not shown, is located for supporting the left end of the motor armature 19, FIG. 3. The metal cap 16 is provided with a pair of ears 20 for receiving the headed end of the tie rods 22.

The end cap 24 located at the right end, FIG. 1, of the motor casing 12 is of a molded dielectric synthetic plastic construction and incorporates the inventive concepts. The end cap 24 has an exterior configuration which will be appreciated from FIGS. 1–4 and its periphery includes linear portions 26 which conform to the configuration of the motor casing, and cylindrical portions 28 which, likewise, conform to the configuration of the motor casing. Ears 30 are defined on the end cap and the ears are formed with holes 32, FIG. 3, through which the tie rods 22 extend.

The end cap 24 includes a central tubular boss 34 in which a cylindrical bearing 36, FIG. 3, is located, and the armature journal 38, FIG. 3, is rotatably received within the bearing. Externally, the end of the armature 19 is accessible through the boss 34, and the armature is provided with a square drive socket 40 located in its end, FIG. 2, for receiving a drive connection for a cable or other power transmitting member, not shown.

Figure 8:
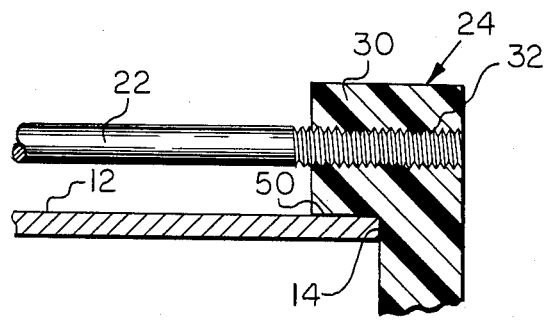
FIG. 8 is an enlarged, detail, elevational, sectional view taken through an end cap ear along Section VIII—VIII of FIG. 2.

The end cap configuration includes a inner surface 42, FIG. 3, from which projects the peripheral flange 44 terminating in the planar edge 46. The configuration of the edge 46 corresponds to the end 14 of the motor casing in that the motor casing end directly abuts the end cap edge. Guide projections 48 defined adjacent the edge 46 help align the end cap 24 upon the motor casing end during assembly. As best illustrated in FIGS. 1, 3 and 8, the end cap ears 30 are of greater axial dimension than the flange 44 and extend beyond the edge 46 so as to "overlap" the motor casing 12 as shown in FIGS. 1 and 8. Internally, the surfaces 50 of the ears 30 which extend beyond the edge 46 are of a convex cylindrical form to closely conform to and engage the outer surface of the motor casing 12. Thus, when the tie rods are tightened, and the ears 30 are drawn toward the left, FIG. 1, the ears tend to deform inwardly, but are restrained against such deformation due to the engagement of the surfaces 50 with the exterior surface of the casing 12. In this manner, the ears 30 are supported against bending by the casing, and relatively high assembly forces can be imposed upon the end cap 24 by the tie rods 22 without damaging or overstressing the end cap ears.

The end cap 24 is reinforced by ribs 54 extending from the planar inner surface 42, and all of the end cap components which are located within the motor casing during assembly homogeneously extend from the inner surface 42 or the edge 46.

Figure 5:
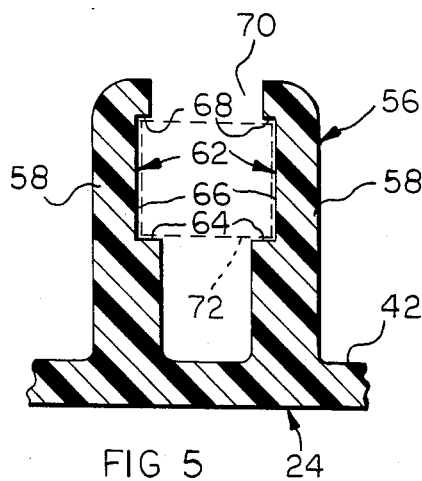
FIG. 5 is an enlarged, detail, elevational, sectional view as taken through the brush retaining fingers along Section V—V of FIG. 4.

In the disclosed embodiment two brush supporting sets 56 are disclosed, diametrically arranged with respect to each other and the axis of the bearing 36. Each brush supporting set includes a pair of fingers 58, and a spring anchor projection 60. The fingers 58 homogeneously extend from the end cap surface 42 and are each of a generally rectangular configuration, FIG. 3, the fingers of each set being parallel and in spaced relationship to each other. As best illustrated in FIG. 5, each finger is provided with an inner side opposed to the associated finger, and an elongated recess 62 is defined in each finger inner side defined by a lower shoulder 64, a base surface 66, and an upper shoulder 68. A slot 70 is defined between the upper ends of the fingers.

The recesses 62 of a set of opposed fingers 58 form a rectangular guide for receiving a conventional rectangular brush 72 as illustrated in FIG. 3 and in dotted lines in FIG. 5. As the brush is of slightly lesser transverse cross-sectional dimension than the associated guide, the brush is able to reciprocate within the guide in a direction toward and away from the axis of the bearing 36.

The anchor projection 60 homogeneously extends from the end cap edge 46 and is of a rectangular form in alignment with the outer lateral edges of the associated fingers 58, and in alignment with the associated brush guide defined by the fingers. As will be noted in FIGS. 3 and 4, the anchor projection 60 is spaced from the associated fingers 58 as at 74, and because of the cantilevered construction of the fingers, the fingers 58 may be deformed toward each other by a tool applied to the outer surface of the fingers to cause the fingers to frictionally clasp a brush located within the associated guide and restrain the brush against radial movement.

Figure 7:
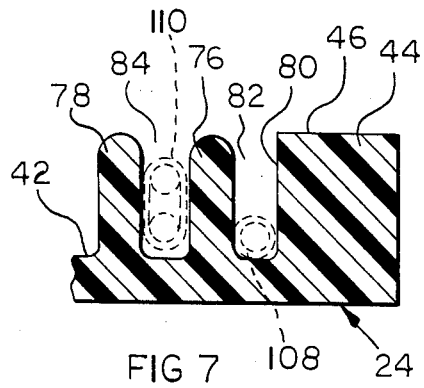
FIG. 7 is an enlarged, detail, elevational, sectional view as taken through the ribs along Section VII—VII of FIG. 4.

Anchoring and strain relief of the electric conductors associated with the motor is achieved by a pair of parallel spaced ribs homogeneously extending from the end cap inner surface 42. The ribs 76 and 78 are of a height substantially corresponding to that of the edge 46, FIG. 7, and flange surface 80 and rib 76, and ribs 76 and 78 define elongated recesses 82 and 84, respectively, of a width substantially equal to or less than the width of the electrical conductors, or connectors received therein, as later described. A notch 86 is defined in the end cap flange 44 of a depth from the edge 46 substantially equal to the diameter of two of the electrical conductors, and from the drawings it will be appreciated that the notch 86 is located adjacent the strain relief ribs 76 and 78.

A circuit breaker retaining hook 88 homogeneously projects from the end cap inner surface 42 and comprises a cantilevered member having a free end of greater width than the body portion 90 forming a hook shoulder 92. In opposed relationship to the hook 88 a cradle 94 is defined in the end cap by surfaces 96 and projections 98, as will be appreciated from FIG. 4. An opening 100 is formed in the end cap by a core member in the injection die used to form the hook shoulder 92.

When assembling the electrical components to the end cap 24 the brushes 72 are inserted into the guide defined by the recesses 62 of a pair of aligned opposed fingers 58. Prior to placing the brushes within the guide a compression spring 102 is located within the guide and bears against the anchor projection 60 wherein the spring will tend to bias the associated brush 72 toward the axis of the bearing 36. As will be appreciated from FIG. 3, the slot 70 defined between the free ends of the fingers receives the brush conductors 104 and permits the brush conductors to freely move with the brushes regardless of the position of the brushes within the associated finger's guide.

Two conductors 106 and 108 provide power to the electric motor 10 and these conductors are of the conventional type consisting of a multi-stranded metal core encased within a plastic dielectric sheath. The conductors 106 and 108 are received within the notch 86. The conductor 106 after entering the end cap through the notch 86, is of such length as to be bent at right angles and provided with a sleeve conductor 110 located within recess 84. The sleeve connector 110 also receives the adjacent brush conductor 104, and in this manner the conductor 106 is electrically connected to the brush conductor 104 and the conductors and sleeve connector are firmly placed within the recess 84. As the length of the sleeve connector 110 is substantially at right angles to the length of the conductor 106 extending through the end cap notch 86, the conductor 106 is firmly held within the end cap providing an effective conductor anchoring and strain relief.

The conductor 108, after entering the notch 86, is bent at right angles to be firmly received within the recess 82, and the conductor 108 is connected to the circuit breaker 112. The circuit breaker 112 is of a configuration as will be appreciated from FIG. 3 and the dotted lines of FIG. 6, and is of a commercially available type and forms no part of the instant invention. At its other end, the circuit breaker 112 is attached to the other brush conductor 104.

Figure 6:
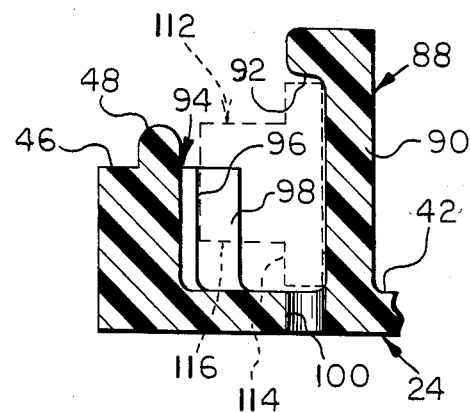
FIG. 6 is an enlarged, detail, elevational, sectional view taken through the circuit breaker retainer hook structure along Section VI—VI of FIG. 4.

The circuit breaker 112 includes a base portion 114, FIG. 6, which engages the hook body portion 90 and is located "under" the hook shoulder 92. The circuit breaker also includes a housing portion 116, FIG. 6, which engages the end cap cradle surfaces 96 between the projections 98. When inserting the circuit breaker into the end cap, the hook 88 will be deflected toward the bearing 36, and the resiliency of the hook will permit the hook to be restored to its normal form as shown in FIG. 6 once the circuit breaker 112 is located "under" the hook shoulder 92. In this manner the circuit breaker is firmly retained within the end cap.

As will be appreciated from FIG. 3, the firm retention of the conductor 108 within the recess 82 will provide strong resistance against withdrawing of the conductor from the notch 86 due to the right angle bend in the conductor providing excellent anchoring and strain relief for conductor 108.

When assembling the end cap 24 to the motor casing 12 it is necessary for the armature journal 38 to be received within the bearing 36, the armature commutator ring 118 of the armature will be in alignment with the brushes 72, and engaged thereby, and the associated end 14 of the motor casing will engage the end cap edge 46.

To permit the assembling of the end cap upon the motor casing, the brushes 72 are retracted toward the associated anchor 60 placing the adjacent brush spring 102 under compression. This radial outward movement of the brushes is necessary to permit the commutator ring 118 to be located between the brushes during assembly. Once the brushes 72 are retracted as desired, the fingers 58 of each set 56 are deformed toward each other by a suitable tool, not shown, which deforms the outer ends of the fingers 58 toward each other sufficiently to permit the finger base surfaces 66 to frictionally clamp the brushes and maintain the brushes in the retracted position. The armature 19 is then placed into the motor casing end, and upon the commutator ring 118 being aligned between the brushes, the finger-deforming tools, which may be in the form of forks, or the like, are removed permitting the fingers to be restored to their normal relationship as shown in FIG. 5, and the brush springs 102 will bias the associated brushes into engagement with the commutator ring.

The casing 12 is now assembled onto the end cap 24 until the casing end 14 engages the end cap edge 46. The engagement of the casing edge with the edge 46 may slightly compress the conductors 106 and 108 within the notch 86 and this frictional engagement of the conductors with each other and the notch provides further strain relief of the conductors, and also prevents the conductors from disassociating themselves from the recesses 82 or 84.

The tie rods 22 are now inserted through the ear openings in ears 20 and the tie rods are provided with self-tapping threads at the outer end whereby the tie rods are threaded into the holes 32 in ears 30. The length of ears 30 provides sufficient thread engagement for this type of assembly and eliminates the need for a tie rod nut. The assembly is now complete, and as the tie rods 22 are tightened, the ears 30 are supported against deformation by the motor casing as described above.

A motor end cap 24 constructed in the aforedescribed manner may be eonomically produced by high production injection molding equipment. The dielectric nature of the end cap eliminates electrical shorting possibilities, assembly may be readily achieved, and excellent conductor anchoring and strain relief minimizes the likelihood of inadvertent conductor failures. Likewise, the retention of the circuit breaker assures a quick and positive assembly of this component within the end cap. It is to be understood that the inventive concepts disclosed herein may be applied to end caps utilized with multiple electric motors such as shown in the assignee's U.S. Pat. No. 4,209,723, and it is understood that various modifications to the inventive concepts may be apparent to those skilled in the art without departing from the spirit and scope of the invention.

I claim:

1. In an electric motor having a tubular casing having ends wherein an armature is rotatably supported within the casing upon end caps mounted upon the casing ends, the improvement comprising, at least one of the end caps being molded of a synthetic plastic dielectric material, an inner surface defined on said one end cap, armature bearing means defined on said end cap defining a bearing axis, a plurality of brush-holding means defined upon said end cap inner surface about said axis, said brush-holding means including a pair of spaced parallel cantilevered fingers homogeneously formed of the material of the end cap having a length extending substantially parallel to said bearing axis, each finger having an outer free end, an inner lateral edge disposed toward said bearing axis, an outer lateral edge remote from said bearing axis, and an inner side, said inner sides of said pair of fingers being in spaced opposed relation to each other, an elongated recess defined in each of said fingers' inner sides having a length projecting toward said bearing axis, the recesses of a pair of fingers being in opposed relation and defining a brush-receiving guide, said fingers' outer free ends being in spaced relation to each other and adapted to be deformable whereby temporary deformation of said fingers toward each other will frictionally grip a brush within said guide to prevent brush movement therein, and a spring anchor projection homogeneously formed of the material of said one end cap adjacent and spaced from said outer lateral edges of a spaced pair of said fingers, said spring anchor projection being in alignment with said brush-receiving guide defined in said spaced pair of fingers.

2. In an electric motor as in claim 1, said spring anchor projection being of a planar configuration having a free outer end located a distance from said end cap inner surface substantially equal to the distance of said fingers' outer free end from said end cap inner surface.

3. In an electric motor having a tubular casing having ends wherein an armature is rotatably supported within the casing upon end caps mounted upon the casing ends, the improvement comprising, at least one of the end caps being molded of a synthetic plastic dielectric material, an inner surface defined on said one end cap, armature bearing means defined on said end cap defining a bearing axis, a plurality of brush-holding means defined upon said end cap inner surface about said axis, an axially extending peripheral flange defined on said end cap extending from said inner surface, an elongated electric conductor-receiving notch defined in said peripheral flange, a pair of parallel spaced ribs homogeneously defined of the material of said end cap projecting from said end cap inner surface adjacent said conductor-receiving notch, said ribs defining elongated conductor-receiving recesses therebetween having a length transversely disposed to the length of said notch whereby a conductor entering said end cap through said notch and located within a rib-defined recess is bent transversely to the length of said notch to provide strain relief of the conductor, an elongated resilient circuit breaker retainer hook homogeneously extending from said end cap inner surface formed of the end cap material, said retainer including a free end, a hook shoulder defined on said free end, a circuit breaker receiving cradle homogeneously defined on said end cap of the material thereof in opposed relation to said retainer hook, said hook shoulder and retainer maintaining a circuit breaker within said cradle upon said retainer being temporarily deflected to permit a circuit breaker to be located between said hook shoulder and end cap inner surface.

4. In an electric motor having a tubular casing having ends wherein an armature is rotatably supported within the casing upon end caps mounted upon the casing ends, the improvement comprising, at least one of the end caps being molded of a synthetic plastic dielectric material, an inner surface defined on said one end cap, armature bearing means defined on said one end cap defining a bearing axis, a plurality of brush-holding means defined upon said one end cap inner surface about said axis, a casing end engaging edge defined upon said one end cap, a plurality of tie rod receiving ears defined on said one end cap homogeneously formed of the material thereof and extending outwardly from the casing and engaging edge, said ears each including an axially extending inner surface extending outwardly beyond said edge and adjacent thereto conforming in configuration to the configuration of the motor casing and extending in the direction of the casing whereby upon placing said one end cap upon a motor casing end such that the casing end engages the end cap edge said ears inner surfaces overlap and engage the exterior surface of the casing adjacent the casing end and the casing supports said ears against inward deflection toward the casing, and a tie rod connected to each ear at a location outward of said inner surface of the associated ear imposing a bending force on the associated ear endeavoring to bend the ear toward the casing.

5. In an electric motor as in claim 4, said tie rods interconnecting the end caps each having an outer end having a self-tapping thread defined thereon, and a hole defined in each ear of said one end cap receiving a thread of at least one of said tie rods.

* * * * *